Nov. 1, 1949 J. T. CALLAHAN, JR., ET AL 2,486,587
PRESSURE MEASURING APPARATUS
Filed Aug. 16, 1944 4 Sheets-Sheet 1
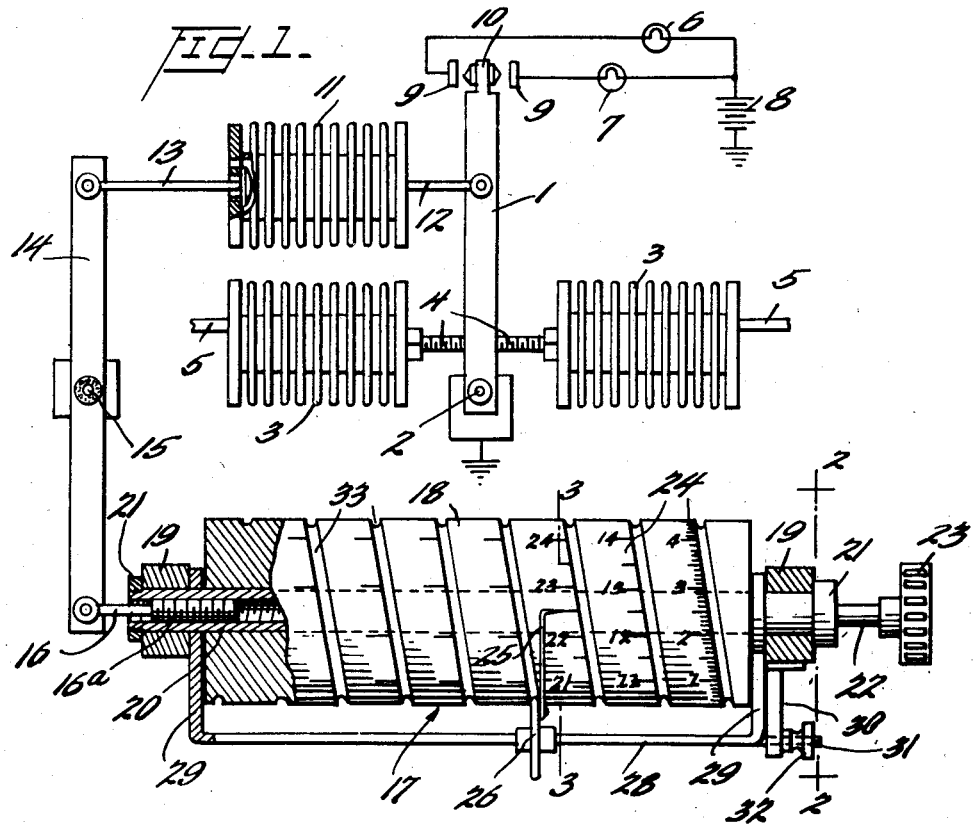
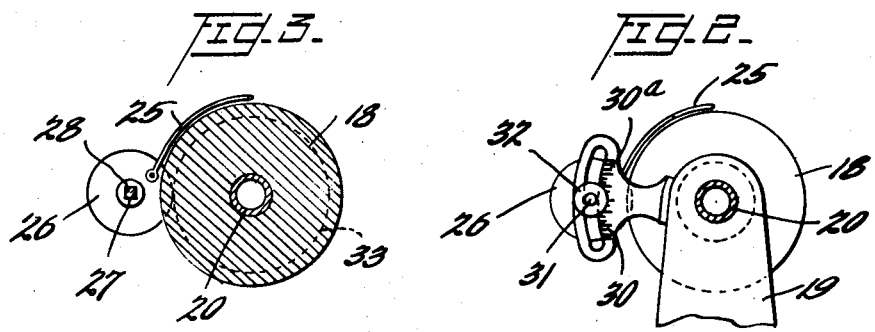
Inventors
John T. Callahan, Jr.,
Donald O. Kocmich
Paul F. Adair
By Joseph U. Hazell
Clark Koontz Attorneys Nov. 1, 1949 J. T. CALLAHAN, JR., ET AL 2,486,587
PRESSURE MEASURING APPARATUS
Filed Aug. 16, 1944 4 Sheets-Sheet 2
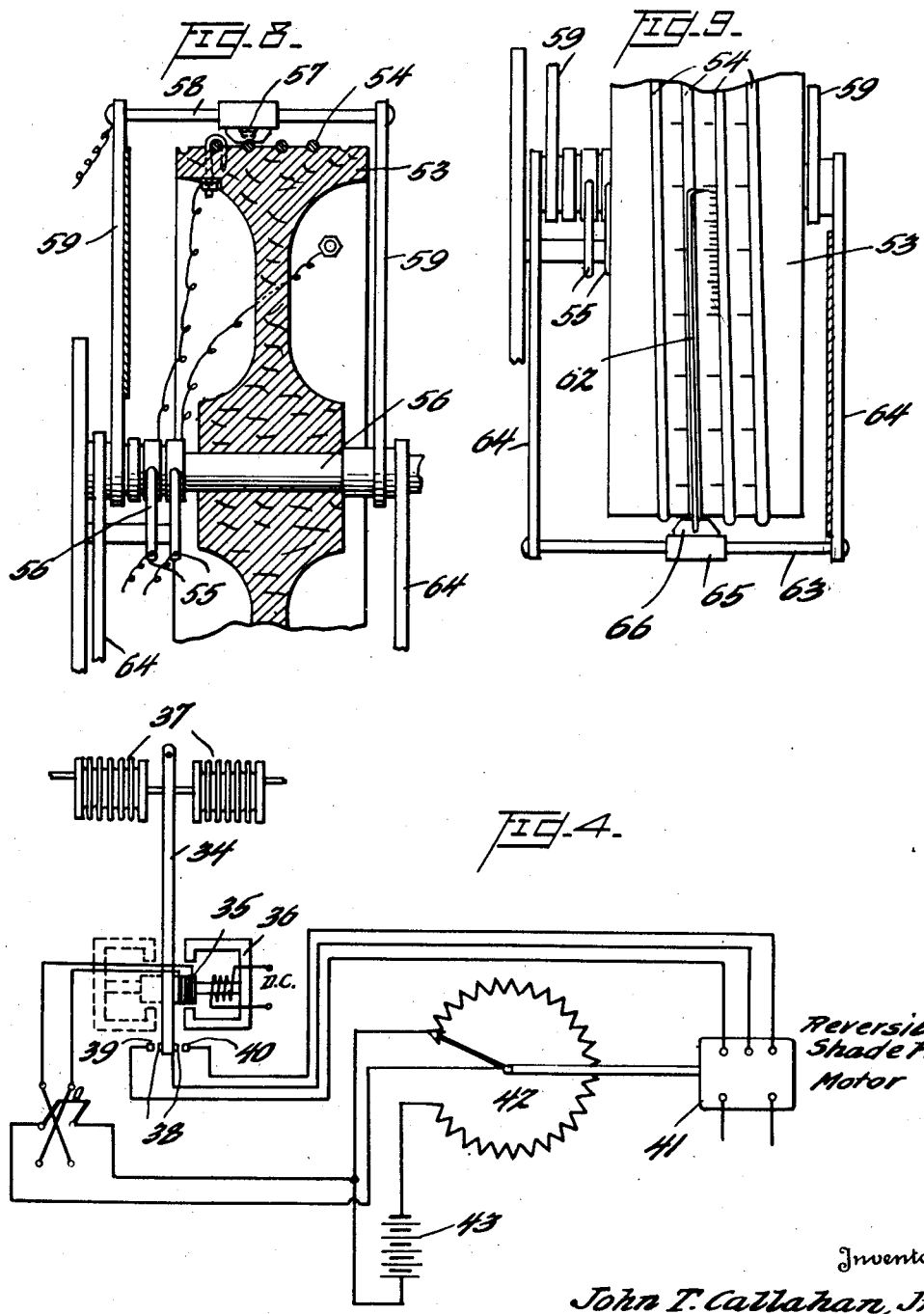

Nov. 1, 1949  J. T. CALLAHAN, JR., ET AL  2,486,587
PRESSURE MEASURING APPARATUS
Filed Aug. 16, 1944  4 Sheets-Sheet 3
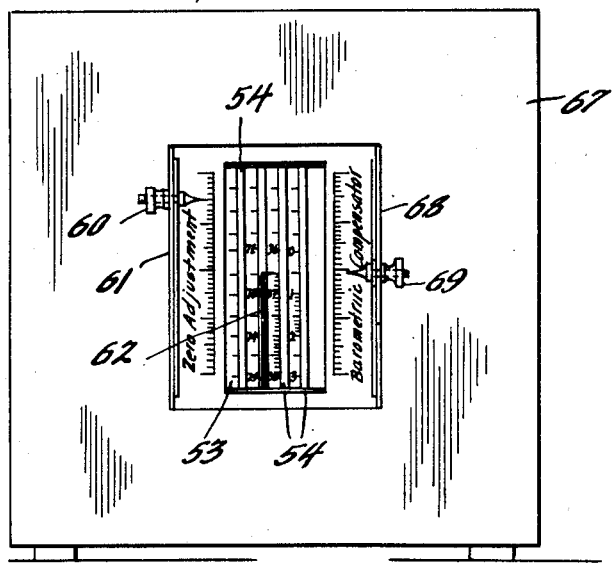
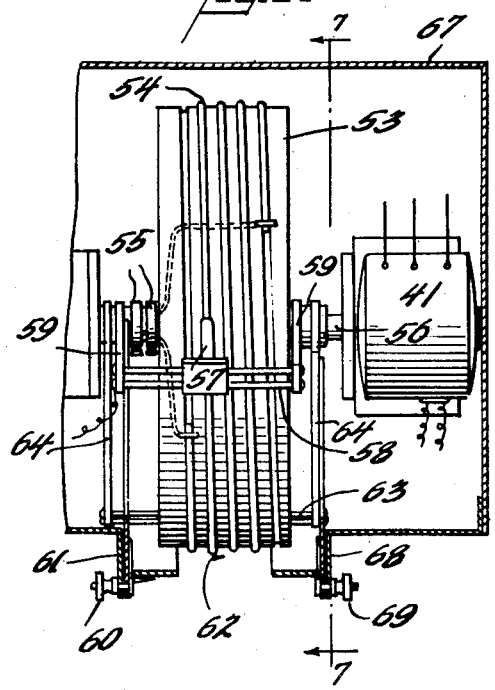
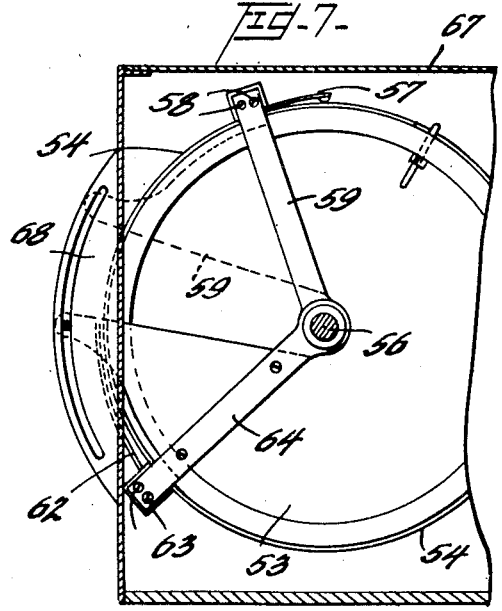

Nov. 1, 1949 J. T. CALLAHAN, JR., ET AL 2,486,587
PRESSURE MEASURING APPARATUS
Filed Aug. 16, 1944 4 Sheets-Sheet 4
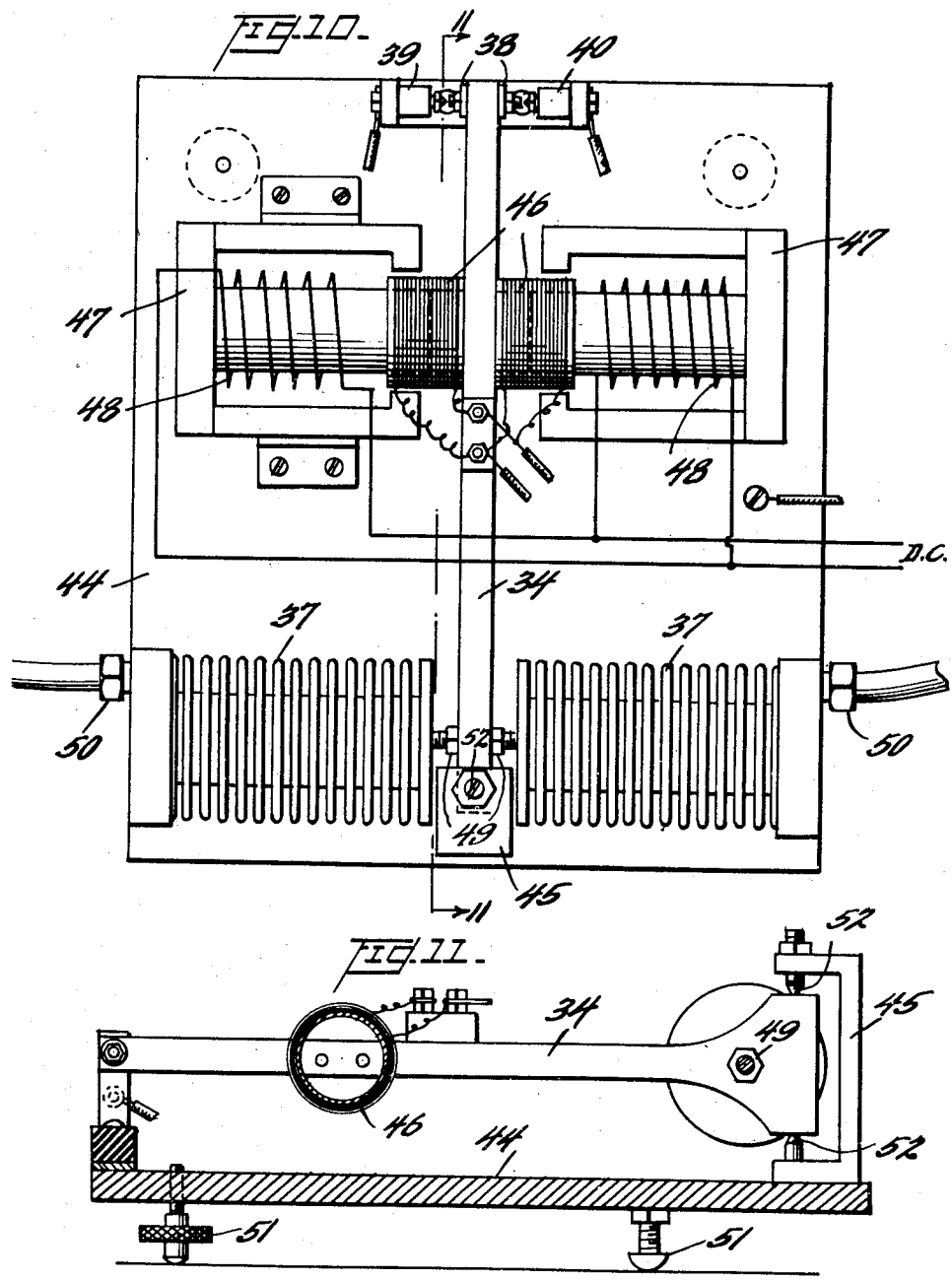
Inventors
John T. Callahan, Jr.
Donald O. Kocmich
Paul F. Adair
By Joseph U. Hoyelland
Clade Kuntz
Attorneys Patented Nov. 1, 1949

2,486,587

UNITED STATES PATENT OFFICE 2,486,587

PRESSURE MEASURING APPARATUS

John T. Callahan, Jr., Tulsa, Okla., Donald O. Kocmich, Western Springs, Ill., and Paul F. Adair, Dayton, Ohio Application August 16, 1944, Serial No. 549,720

5 Claims. (Cl. 73—407)

1

The invention described herein may be manufactured and used by or for Government for governmental purposes without the payment to us of any royalty thereon.

This invention is a device for measuring the magnitude of variations in a quantity which are effective to move a movable member from a normal position. More particularly, the invention is an adaptation of a pressure measuring device or manometer in which variations in pressure from a source to be measured are caused to move a movable member from a normal position and in which the movable member is restored to normal position by a controlled force responsive to movement of said movable member.

In certain fields of pressure measurements, particularly the field of measuring carburetor or exhaust and manifold pressures for aviation engines, there is need for a pressure measuring device wherein, through mechanical or electrical means, minute variations in pressure may be accurately measured or indicated. While there are at present available both mechanical and electrical pressure measuring devices, these have proven to be inadequate for the rigid specifications incident to measurements in the field of aviation carburation, and with this in mind the present invention seeks to provide a pressure measuring device which will answer the needs in this field.

One object of the invention is to provide means for yieldingly positioning a member which is movable in response to minute pressure variations and to provide either mechanical or electrical means for accurately measuring the force required to restore said member to a normal position.

Another object of the invention is to provide in an apparatus of the character described, means wherein hysteresis losses are maintained at a minimum.

Another object of the invention is to provide in a pressure measuring apparatus of the character described, mechanical or electrical motion transmission means in which lost motion linkage has been to a large extent eliminated.

Another object of the invention is to provide in a measuring instrument of the character described an indicator in the form of a rotatable drum wherein the calibrations are arranged in a helical series and wherein a pointer is arranged to move axially of the drum so as to maintain the indicating portion of said pointer on the active portion of the scale.

Another object of the invention is to provide in an electrical pressure measuring instrument of the character indicated, a variable resistance in the form of a helically wound potentiometer, the drum of which is connected to be rotated by a reversible electric motor, energization of which is controlled in response to variations in pressure to be measured.

Another object of the invention is to provide an electric manometer which will operate within a degree of accuracy of .1 percent throughout the total scale range of the instrument, and without the use of delicate, sensitive electrical equipment such as galvanometers and the like.

Another object of the invention is to provide a relatively rugged instrument with the degree of accuracy described having a pressure range of 100 inches or more at hydrostatic head which maintains this accuracy over the entire range.

These and other objects of the invention will become apparent from reading the following specification in connection with the drawings, wherein we have illustrated preferred embodiments of the invention.

In the drawings:

Figure 1 is a plan view generally diagrammatic, of one form of our invention, wherein the indicator is mechanically connected to the pressure responsive member.

Fig. 2 is a fragmental detail view in side elevation of the means for adjustably supporting the indicating pointer.

Fig. 3 is a detail sectional view showing the manner in which the pointer is mounted for axial movement with respect to the indicating drum.

Fig. 4 is a diagrammatic view showing a modification of our invention wherein electrical means are employed for connecting the indicator to the pressure responsive member.

Fig. 5 is a top plan view with parts in section showing the motor drive for the drum type potentiometer.

Fig. 6 is a front elevation of the indicating panel within which the potentiometer drum operates.

Fig. 7 is a detailed sectional view showing the means for adjustably mounting the potentiometer brush and indicating pointer.

Fig. 8 is a sectional view taken at right angles to that of Fig. 7.

Fig. 9 is a fragmental elevation showing the cooperation between the indicating pointer and the drum.

Fig. 10 is a top plan view of the pressure responsive unit of the instrument.

Fig. 11 is a sectional view taken on the line 11—11 of Fig. 10.

Referring more particularly to the accompanying drawings, in which like reference numerals are used to designated like parts throughout, we have shown in Fig. 1 means for mechanically indicating the magnitude of a force which is arranged to move a movable member out of a predetermined normal position. Thus, in Fig. 1 a movable member 1 in the form of a lever pivoted at 2, is provided with means 3 each of which is responsive to variations in a magnitude of a condition such as pressure, said means being arranged to move said member 1 out of a predetermined normal position. The pressure responsive means 3 may be metallic bellows of well known construction, one end of each of said bellows being suitably connected by means of screw-threaded rods 4 to opposite sides of the lever 1 and arranged so that expansion of said members 3, due to applied pressure, will cause opposing forces to be exerted upon said lever. The opposite ends of said members 3 are provided with means such as nipples 5 for connection to atmosphere or to suitable sources of pressure. Movements of the lever 1 in either direction are indicated by signal devices 6 and 7, said signal devices being in the form of electric lamps connected to a battery 8 and to oppositely disposed contacts 9 arranged on opposite sides of a contact carrying head 10 of the lever 1. The lever 1 and battery 8 are grounded, as shown, so that as the lever 1 moves from its central normal position in one direction or the other, the signal devices 6 and 7 are selectively energized to indicate the direction of movement of the lever.

Means are provided for yieldingly maintaining the lever 1 in its central normal position. Such means are shown in Fig. 1 in the form of an open-ended metallic bellows 11, one end of which is connected to the lever 1 by the link or rod 12, while the other end of the bellows is connected by the link 13 to one end of a lever 14 pivoted intermediate its ends at 15 to a fixed part of the apparatus. The lower end of the lever 14 is pivotally connected to a link 16 which in turn is operatively associated with the indicating device shown generally at 17.

The indicating device comprises a cylindrical drum-like member 18 mounted for rotation about its axis in supporting brackets 19, the drum for this purpose being provided with a hollow, interiorly threaded axle 20. The drum and axle are fixed against axial movement within the support members 19 by suitable collars 21. The link member 16 is provided on its free end with a screw-threaded portion 16ª, said portion being screw-threadedly engaged with the interior screw threads of the axle 20, as clearly shown in Fig. 1. The opposite end of the axle 20 is provided with an extension 22 carrying an operating handle 23 by which the drum may be rotated. Thus, by rotating the drum in one direction or the other, the screw-threaded link 16 is moved to the right or left as viewed in Fig. 1 to cause rocking movement of the lever 14 to be communicated through the bellows 11 to the lever 1 to thereby apply to the lever a restoring force of a magnitude equal to the displacing force applied thereto by the fluid pressure responsive members 3.

We associate with the drum 18 means for indicating the magnitude of the restoring force, said indications being preferably in the form of inches of calibrated hydrostatic head, where pressures are being measured. Thus, we provide an indicating scale 24 disposed on the exterior surface of said drum in the form of a helix. Also, we provide an indicating pointer 25 cooperating with said scale to give an indication of the pressure being measured. In order to provide for the automatic positioning of the pointer 25 axially of the cylinder 18 as the latter is rotated, the pointer 25 is mounted upon a spool member 26 which, as shown in Fig. 3, is provided with an angular bore 27 for mounting upon a square shaft 28 extending parallel to the axis of the drum 18 and in slightly spaced relation to the surface of the drum. The shaft or rod 28 may be mounted in any convenient maner, such as by bracket arms 29 pivotally engaging the axle 20. Means in te form of an outstanding slotted bracket 30 is provided for positioning the pointer 25 circumferentially of the drum in order to correlate the pointer with the zero indication on the scale under different atmospheric conditions. To this end one of the arms 29 carries a screw-threaded lug 31 which extends through the slotted bracket 30 and in which it may be clamped in any desired position by means of a thumb screw 32, all of which is clearly shown in Figs. 1 and 2. If desired, the slotted bracket 30 may be provided with a suitable indicating scale 30ª corresponding to normal variations in atmospheric pressure in order to facilitate adjustment of the pointer 25. The pointer carrying spool 26 is moved axially along the drum as the latter rotates by engagement with a helical groove or thread 33 provided on the surface of the drum and in which the periphery of the spool 26 engages.

In this form of the invention the open-ended bellows 11 forms a direct yielding connection between the lever 1 and the indicating device 17, and this arrangement makes possible the elimination of substantial lost motion due to more elaborate linkage systems which have characterized the prior art. Furthermore, the hysteresis loss incident to use of a metallic spring member 11 is negligible.

With the apparatus as thus described it is desirable always to connect the left hand bellows member 3 to the higher source of pressure and the the right hand bellows member 3 to the lower source of pressure. As thus arranged, the lever 1 is always displaced to the right, as viewed in Fig. 1, so that the restoring force applied through the spring member 11 will tend to distend said member rather than compress it. It has been found that the spring member 11 is less subject to error when the restoring force transmitted through it tends to distend said member rather than compress it. It will be understood that the electric signal devices 6 and 7 keep the operator informed as to whether the restoring force applied to the lever 1 by rotation of the knob 23 is less than or greater than the displacing force applied to the lever 1 through the pressure responsive devices 3, so that the knob 23 may be manipulated in the proper direction to restore the lever 1 to its central position.

The same general principles involved in the embodiment of the invention as described may be embodied in a pressure indicating and measuring apparatus in which electrical means are employed for operatively connecting the member which moves in response to variations in pressure to the indicating and measuring instrumentality. Thus, in Fig. 4 we have diagrammatically shown a pivotally mounted member 34 carrying electromagnetic means in the form of a coil 35 for movement through a substantially constant electromagnetic field produced by either a permanent magnet or an electromagnet 36. The lever 34 is connected, as shown in Fig. 1, to one or to a pair of pressure responsive bellows members 37, so as to be moved in response to variations of pressure or variations in the differential pressure to which said pressure responsive devices are connected. The lever 34 also carries contacts 38 at one end thereof which are positioned to cooperate with opposing contacts 39 and 40 disposed in the path of movement of said lever and on opposite sides thereof. The contacts 39 and 40 are respectively connected to opposite field terminals of a reversible shaded pole motor 41, while the lever carried contacts 38 are connected to the central field terminal of said motor. The motor 41 may be connected to any suitable source of potential, not shown, and when energized due to contact between contacts 38 and 40 or between 38 and 39, the motor will be driven in one direction or the other to adjust the resistance of a potentiometer element indicated generally by the reference character 42, to which said motor 41 is drivingly connected. The electromagnetic means 35 carried by the lever 34 is energized through said potentiometer from a suitable source of potential indicated at 43. The constant field generating means 36 is connected to any convenient source of constant D. C. potential.

Although the apparatus as described and including only one constant magnetic field inducing means 36 and one electromagnetic coil 35, will operate satisfactorily for pressure variations within a limited range, if it is desired to extend the operative range of the instrument, this may be readily accomplished by duplicating the coil 35 and the constant magnetic field means 36, as indicated in dotted lines in Fig. 4.

It will be understood that the operation of the instrument diagrammatically indicated in Fig. 4 is based on the movement of the lever 34 out of its central or normal position by one or both of the pressure responsive means 37, and the restoration of the lever to its normal position against said displacing force by a restoring force set up between the electromagnetic means 35 and the constant magnetic field generating means 36. To this end it is desirable to associate the right-hand Sylphon 37, as shown in Fig. 4, with a positive source of pressure or with the higher source of pressure when two sources of pressure are being compared. Thus, the lever 34 will be deflected to the left, as viewed in Fig. 4. Under this arrangement the polarity of the magnetic fields established by the members 35 and 36 will be opposite, so that the lever 34 will be returned to normal position by magnetic attraction. When two coils 35 are employed in connection with two sources of constant magnetic field 36, as previously suggested, the polarity of the fields produced by the devices 35 and 36 arranged on the left hand side of the lever 34, as viewed in Fig. 4, is the same, so that the magnetic effect in restoring the lever 34 to central position will be additive.

It is apparent from the foregoing explanation of operation that if a negative source of pressure is to be measured it should be connected to the left-hand bellows 37 so that the lever 34 will still be urged to the left as viewed in Fig. 4 when moved from its central position. In the event only one bellows, such as the right-hand bellows 37 in Fig. 4, is employed, the apparatus can be arranged to measure both positive and negative pressures by employing a reversing switch in the energizing circuit for the coil 35 so that the fields of the members 35 and 36 may be arranged to attract or to repel each other, depending upon whether the source of pressure applied to the right-hand bellows 37 is a positive or a negative pressure.

In the normal position of the parts with no pressure or with atmospheric pressure applied to both bellows members 37, the lever 34 is in its central position and the adjustable resistance element 42 has the movable pointer arranged as shown so that a minimum of current is supplied to the coil 35. As the lever 34 is moved to the left in response to pressure variations, the contacts 38 and 39 are engaged to energize the motor 41 to adjust the resistance element to energize the coil 35. The motor will continue to operate to gradually increase the strength of the energizing current until the displacing force resident in the pressure responsive means 37 is exactly matched by the electromagnetic reaction between the fields of the members 35 and 36, at which time the contacts 38 and 39 are opened and the lever 34 remains in central position. If the lever moves to the opposite side of its central position the contacts 38 and 40 are engaged to energize the motor 41 in a reverse direction to reduce the magnitude of the magnetic restoring force, and thus return the lever to central position.

The pressure responsive unit of this type of instrument is shown more clearly in Figs. 10 and 11 wherein the lever 34 is shown mounted upon a suitable base 44 by means of a bracket member 45. The electromagnetic means carried by the lever 34 is here shown in the form of two electromagnetic coils 46, 46, said coils being mounted on hollow coil forms extending laterally from the lever 34 so as to dispose said coils normally within constant magnetic field producing means, such as electromagnets 47. The magnetic circuits of said magnets 47 are designed to operate in connection with the coils 46 to maintain the latter centralized with the lever 34 in normal position. The electromagnetic devices 47 have their coils 48 connected in parallel to a constant source of direct current, not shown, whereas the electromagnetic coils 46 carried by the lever 34 are similarly connected in parallel to the potentiometer circuit, as shown in Fig. 4. The lever 34 carries at its upper end the contacts 38 which cooperate with contacts 39 and 40 mounted in any convenient manner upon the base 44. The pressure responsive bellows members 37 are mounted upon the base 44, one end of each of said members being connected to the lever 34 by bolt members 49, the opposite ends of said members being provided with nipples 50 for connection to atmosphere or to suitable sources of pressure. The base, if desired, may be provided with suitable leveling devices 51 for maintaining the lever pivots 52 in substantially vertical alignment.

The potentiometer indicated diagrammatically by the reference character 42 in Fig. 4 is preferably constructed in the form of a rotatable drum 53, as shown in Figs. 5 and 8, said drum having mounted on the periphery thereof a helically wound resistance element 54, the opposite ends of which are connected through suitable slip rings and brushes 55 to a source of potential, such as 43 of Fig. 4. The drum 53 is mounted for rotation about a preferably horizontal axis on a shaft 56, the latter being supported in any suitable brackets or journal members. The brush 57 of the potentiometer is mounted for sliding movement axially of the drum upon a pair of rod members 58, said rod members being mounted in the outer ends of bracket arm 59 pivotally mounted on the shaft 56. Thus, the brush of the potentiometer may be adjusted circumferentially of the drum to maintain predetermined or desirable magnetic bias upon the coils 46 carried by the arm 34. Any suitable means, such as a thumb screw 60 operating in connection with a slotted sector plate 61 carried by an enclosing casing, may be employed for securing the bracket arm 59 in adjusted position, in a manner to be hereinafter described.

The face or periphery of the drum 53 is provided with a scale, the calibrations of which indicate pressure increments, such as feet or inches in height of a hydrostatic column. The scale is disposed helically about the drum and cooperating therewith is a pointer member 62, said pointer being mounted for axial sliding movement along the surface of the drum upon guide rods 63 fixedly supported in free ends of bracket arm 64 pivotally mounted on the shaft 56. The pointer 62 includes a block 65 slidable upon said rods 63 and carries a grooved finger 66 having insulating engagement with the helically wound resistance element 54, as clearly shown in Fig. 9. By this means the pointer 62 and block 65 traverse the full extent of the drum as the same is rotated to maintain the pointer 62 in cooperative engagement with the active portion of the helical scale.

The potentiometer may be housed within a suitable casing 67, said casing being provided with a glass or transparent plastic covered aperture through which the pointer 62 and the calibrations of the scale on the drum 53 are clearly visible, as shown in Fig. 6. The bracket arms 59 and 64 which control, respectively, the circumferential position of the potentiometer brush 57 and the pointer 62, are provided with lugs which extend through slots in the front wall of the casing and cooperate there with slotted sector plates 61 and 68, respectively, whereby the bracket arms 59 and 64 may be retained in adjusted position by means of thumb screws 60 and 69, respectively. The casing 67 is readily removable to expose the entire potentiometer and motor 41 for inspection and adjustment.

The pressure responsive unit shown in Fig. 10 may similarly be provided with a suitable housing, not shown, and said pressure unit and the potentiometer unit may be arranged as separate entities or, if desired, they may be conveniently mounted on a single base or panel. By mounting the pressure unit and potentiometer on separate bases there is the advantage of convenience in portability of the apparatus as a whole and the units may be conveniently electrically connected by plug and socket electrical connectors (not shown) in a manner well known.

In both types of apparatus such as shown in Figs. 1 and 10, we propose to maintain a very small clearance between the movable and stationary contacts associated with the lever that is moved in response to pressure. This clearance is of the order of .002''. With this in mind, we propose to employ an electronic control network (not shown) in the motor circuit of Fig. 4 in order to reduce the voltage and eliminate sparking at the contacts 38, 39 and 40. Such a control is well known and forms no part of the present invention.

From the foregoing description of our invention it is apparent that we have provided pressure responsive means for moving an element from a normal position together with means for providing a calibrated restoring force of a magnitude sufficient to overcome the displacing force, together with means for indicating and/or measuring the magnitude of the restoring force. The means employed for translating movements of the movable member into increments of pressure may be either mechanical or electrical, as shown, and in either case, the instrumentalities employed in accordance with the teachings of the present invention are such as to provide an apparatus which will repeat its readings within an accuracy of .1 of one percent variation in the height of a hydrostatic column of water, or other liquid. This accuracy can be maintained over long periods of use because of the absence of hysteresis and linkage errors and is achieved without resorting to such delicate electrical apparatus as galvanometers and the like, the use of which characterizes previously known electric manometers.

It will be understood that the embodiments disclosed in the accompanying drawings are but for the purpose of illustration only, and we reserve the right to make such changes in the combination of parts and details of construction as fairly fall within the scope of the appended claims, wherein we have set forth in detail the novel features of our invention.

Having thus described our invention, what we claim as new and desire to secure by Letters Patent is:

1. The combination with a movable member having a normal position, and means for moving said member from said normal position in response to variations in the magnitude of a quantity to be measured, of electromagnetic means carried by said movable member, a drum mounted for rotation about its own axis, means for variably energizing said electromagnetic means including an adjustable resistance and a source of potential, said adjustable resistance comprising a resistance element wound helically upon the surface of said drum, means for establishing a substantially constant magnetic field in the path of movement of said electromagnetic means when said member is moved from its normal position, means for rotating said drum in either direction about its own axis, and means responsive to movement of said member from normal position for energizing said drum rotating means for controlling said adjustable resistance for variably energizing said electromagnetic means to create a measurable magnetic restoring force for the movable member, indicator means mounted for movement longitudinally of said drum substantially parallel to the axis thereof, drive means for the indicator including motion transmission means for converting the rotary movement of the drum into longitudinal movement of the indicator, and a helically arranged scale on the surface of the drum cooperating with said indicator.

2. The combination with a movable member having a normal position, and means for moving said member from said normal position in response to variations in the magnitude of a quantity to be measured, of electromagnetic means carried by said movable member, means for variably energizing said electromagnetic means including an adjustable resistance and a source of potential, means for establishing a substantially constant magnetic field in the path of movement of said electromagnetic means when said member is moved from its normal position, and means responsive to movement of said member from normal position for controlling said adjustable resistance for variably energizing said electromagnetic means to create a measurable magnetic restoring force for the movable member, said adjustable resistance comprising a resistance element helically wound upon a rotatable drum and said drum is operatively connected to be driven by a reversible electric motor, the energization of which is under the control of said movable member, said drum being provided with a helically arranged scale calibrated in units of said variable quantity to be measured, and a pointer arranged to move axially of the drum as the same is rotated to maintain said pointer on the active portion of said helical scale.

3. The combination with a movable member having a normal position, and means for moving said member from said normal position in response to variations in the magnitude of a quantity to be measured, of electromagnetic means carried by said movable member, means for variably energizing said electromagnetic means including an adjustable resistance and a source of potential, means for establishing a substantially constant magnetic field in the path of movement of said electromagnetic means when said member is moved from its normal position, and means responsive to movement of said member from normal position for controlling said adjustable resistance for variably energizing said electromagnetic means to create a measurable magnetic restoring force for the movable member, said adjustable resistance comprising a resistor helically wound upon a rotatable drum and said drum is operatively connected to a reversible electric motor, the energization of which is under the control of said movable member, an indicating scale carried by the drum, a pointer cooperating with the scale, and means for adjustably mounting the pointer for movement circumferentially of the drum to adjust the pointer in respect to the zero point of the scale.

4. The combination with a movable member having a normal position, and means for moving said member from said normal position in response to variations in the magnitude of a quantity to be measured, of electromagnetic means carried by said movable member, means for variably energizing said electromagnetic means including an adjustable resistance and a source of potential, means for establishing a substantially constant magnetic field in the path of movement of said electromagnetic means when said member is moved from its normal position, and means responsive to movement of said member from normal position for controlling said adjustable resistance for variably energizing said electromagnetic means to create a measurable magnetic restoring force for the movable member, said adjustable resistance comprising a resistor helically wound upon a rotatable drum, and said drum is operatively connected to a reversible electric motor, the energization of which is under the control of said movable member, a brush for slidingly engaging the resistor as the drum is rotated, and means for adjustably mounting said brush circumferentially of the drum to control the degree of energization of said electromagnetic means in the said predetermined position of said movable member.

5. A manometer comprising a base member, a member mounted on the base member for movement in a predetermined path, pressure responsive means adapted to be placed in communication with a source of pressure to be measured and operatively connected to said movable member to move the same from a predetermined normal position in response to pressure variation in said source, means on said base member for establishing a magnetic flux in the path of movement of said movable member, means on the movable member for establishing a second magnetic flux, the fields of said magnetic fluxes intersecting and being of such polarity as to provide a magnetic force tending to restore the movable member to said normal position when moved therefrom, one of said magnetic fluxes being of substantially constant intensity, and means for varying the intensity of the other magnetic flux in proportion to the magnitude of the force effective to move said movable member by said pressure responsive means and means for indicating the magnitude of said force in terms of pressure, said means for establishing said second magnetic flux comprising an electromagnet, said means for varying the intensity of said flux including a source of potential and a variable resistance in series with said electromagnet, said resistance being in the form of a helix, means for mounting said helical resistance for rotation in opposite directions, said indicating means including a helically arranged scale calibrated in terms of pressure associated with the helical resistance and a pointer cooperable with said scale, means for mounting the pointer for movement longitudinally of said helix generally parallel to the axis thereof, and means slidingly engaging said helical resistance and operatively connected to said pointer for so moving the same when the helical resistance is rotated.

JOHN T. CALLAHAN, Jr.
DONALD O. KOCMICH.
PAUL F. ADAIR.

REFERENCES CITED

The following references are of record in the file of this patent:

UNITED STATES PATENTS

| Number | Name | Date |
|---|---|---|
| 764,572 | Fulton | July 12, 1904 |
| 1,191,416 | Gibson | July 18, 1916 |
| 1,416,210 | Jung et al. | May 16, 1922 |
| 1,494,586 | Cary | May 20, 1924 |
| 1,573,850 | Naiman | Feb. 23, 1926 |
| 1,682,602 | Dawley | Aug. 28, 1928 |
| 1,822,075 | Aronoff | Sept. 8, 1931 |
| 1,822,184 | Wunsch | Sept. 8, 1931 |
| 2,112,682 | Ryder | Mar. 29, 1938 |
| 2,151,941 | Rydberg | Mar. 28, 1939 |
| 2,223,712 | Ziebolz | Dec. 3, 1940 |
| 2,343,181 | Heinz | Feb. 29, 1944 |
| 2,371,040 | Fisher et al. | Mar. 6, 1945 |
| 2,398,470 | Shivers | Apr. 16, 1946 |

FOREIGN PATENTS

| Number | Country | Date |
|---|---|---|
| 248,384 | Great Britain | May 25, 1927 |
| 454,443 | Great Britain | Oct. 1, 1936 |